Patented Aug. 11, 1942

2,292,479

UNITED STATES PATENT OFFICE 2,292,479

TEXTILE TREATMENT AGENT

Reginald John William Reynolds, John Donald Rose, and Eric Everard Walker, Blackley, Manchester, England, assignors to Imperial Chemical Industries Limited, a corporation of Great Britain No Drawing. Application May 15, 1939, Serial No. 273,806. In Great Britain May 17, 1938

5 Claims. (Cl. 260—297)

This invention relates to the manufacture of new textile treatment agents and to their use in the production of dyed textile materials.

This invention has as an object to provide new agents for the treatment of cellulosic textiles whereby the fastness of dyeings on the textiles can be improved. A further object is to devise a method whereby such new agents can be manufactured. A still further object is to devise a new method of dyeing cellulosic textiles. Further objects will appear hereinafter. These objects are accomplished by the following invention.

We have found that the dyeing fastness of cellulosic textiles can be improved by treatment with ethers, which are also di-quaternary-ammonium compounds, of the general formula $$Y-Z-A-CH_2-O-CH_2-Z'-X$$

where Z and Z' each represent a tertiary amine (in the formula combined as quaternary ammonium) and may be alike or different, X and Y stand for chlorine or bromine atoms, and A is a divalent hydrocarbon radical.

According to the invention the said compounds are made by effecting combination between a di-halogenoalkyl ether of the general formula $$Y-A-CH_2-O-CH_2-X$$

where Y, X and A have the meanings given above. and two molecular proportions of a tertiary amine or amines.

As ethers of the formula $$Y-A-CH_2-O-CH_2-X$$

to be used according to the invention there come into consideration, for example, 2-cholorethyl chloromethyl ether (Litterscheid, Liebig's Annalen der Chemie, 1903, v'ol. 330, page 127), 2-bromo-ethyl chloromethyl ether and 3-chloropropyl chloromethyl ether.

As tertiary amines to be used according to the invention there come into consideration for example trimethylamine, triethylamine, dimethylaniline, the alkyl piperidines, N-benzylpiperidine, pyridine, the picolines, and quinoline. Mixtures of such amines, for example crude pyridine bases, consisting essentially of mixtures of pyridine and α-picoline, may likewise be used. Alternatively since the reaction is conveniently carried out in two stages, a different amine may be used in each stage.

For ease of manipulation it is often convenient to use more than two molecular proportions of the amine, when that is a liquid, as the excess then serves as a diluent for the reaction mixture. When the amine is a gas, e. g. trimethylamine, the reaction is conveniently carried out in presence of a solvent, e. g. benzene or ethanol.

In carrying the invention into practical effect the ether, together with any solvent, is stirred at room temperature or even lower, e. g. at 0° C., and the base is slowly added, if desired in the form of a solution. A vigorous exothermic reaction occurs, the halogenomethyl group of the ether reacting with one molecular proportion of the base. When this reaction has ceased the mixture is heated for a few hours at a moderate temperature, e. g. 100° C. to bring about the reaction of a second molecular proportion of base with the remaining halogenoalkyl group of the ether. It will be apparent that by adding in the first stage of the process only one molecular proportion of a base and subsequently heating with a molecular proportion (or an excess) of a different base, there can readily be made compounds of the type $$Y-Z-A-CH_2-O-CH_2-Z'-X$$

where Z and Z' represent two different tertiary amines.

The new diquaternary salts are obtained in the form of gummy resins, or, in some cases, after purification, as crystalline solids. They are hygroscopic and very soluble in water, less soluble in the lower aliphatic alcohols and practically insoluble in ether or hydrocarbon solvents, e. g. benzene.

By a further feature of the invention the new compounds are used in textile treatment processes wherein affinity for acid dyestuffs is to be conferred on cellulosic textile materials or wherein the fastness of dyeings on cellulosic textiles is to be improved. Such processes are those wherein cotton dyed with direct dyestuffs is after-treated to give the dyeing greater fastness to washing, and those wherein viscose artificial silk is treated to give it affinity for acid dyestuffs so that mixed fabrics containing viscose artificial silk and wool can be uniformly dyed with the dyestuffs hitherto used for dyeing wool.

Thus cellulosic textile material dyed with direct dyestuffs is treated with a solution (conveniently an aqueous solution of 1–5% strength) of one or more of the said ethers, together with, if desired, a small proportion of an acid-reacting subtsance (e. g. ammonium dihydrogen phosphate), dried and then heated for a short time at a moderately elevated temperature (e. g. 5–15 minutes at 150° C.). The fastness of the dyeings to water and to aqueous soap washing is thereby greatly improved.

Alternatively, when it is desired to impart to cellulosic textile materials, particularly viscose, affinity for acid dyestuffs, the undyed material is similarly treated with a solution (conveniently an aqueous solution of 2–10% strength) of one or more of the said ethers, optionally in presence of a small proportion of an acid-reacting substance (e. g. ammonium dihydrogen phosphate), dried and heated for a short time at a moderately elevated temperature, e. g. 10–30 minutes at 100–160° C.; it can then be dyed with acid colours in the way normally used in dyeing wool.

The invention is illustrated but not limited by the following examples in which parts are by weight.

*Example 1*

To 43 parts of 2-chloroethyl chloromethyl ether, which is kept cold and stirred, 63 parts of pyridine are added slowly. When all is added, the mixture is warmed gradually to 100° C. and kept at that temperature for 3 hours. A red gummy substance separates. The excess of pyridine is decanted from this and it is then dissolved in ethyl alcohol. On adding acetone crystals separate.

The compound thus obtained is the dipyridinium dichloride corresponding with the formula

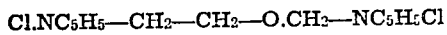
Cl.NC₅H₅—CH₂—CH₂—O.CH₂—NC₅H₅Cl

*Example 2*

143 parts of 3-chloropropyl chloromethyl ether (a liquid of B. P. 63° C. at 15 mm. pressure made by causing trimethylene chlorohydrin to interact in aqueous medium with paraformaldehyde and hydrogen chloride) are treated with 320 parts of pyridine, the manipulation being as described in Example 1. The gummy mass obtained is allowed to stand when it becomes a hygroscopic crystalline mass of (pyridylmethyl 3-pyridylpropyl ether) dichloride of the formula

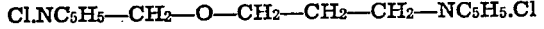
Cl.NC₅H₅—CH₂—O—CH₂—CH₂—CH₂—NC₅H₅.Cl

*Example 3*

To 65 parts of 2-chloroethyl chloromethyl ether which is stirred at 0° C., there are added slowly 50.5 parts of triethylamine, whereupon a white gummy mass separates out. 40 parts of pyridine are then added and the mixture is gradually heated to 100° C. during one hour and maintained at that temperature for a further two hours. There is thus obtained a red brown gummy mass which is washed repeatedly by stirring with acetone and is finally dried in vacuo. The compound is believed to have the formula

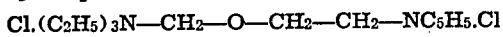
Cl.(C₂H₅)₃N—CH₂—O—CH₂—CH₂—NC₅H₅.Cl

*Example 4*

To 28 parts of 3-chloropropyl chloromethyl ether, cooled to 0° C., there are added, with stirring, 50 gms. of α-picoline. When all is added, the mixture is heated slowly to 100° C. and maintained at that temperature for 2 hours. A dark red mass of very hygroscopic crystals is obtained. This is washed with acetone to remove the excess of the base and dried. The compound thus obtained has the formula

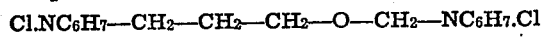
Cl.NC₆H₇—CH₂—CH₂—CH₂—O—CH₂—NC₆H₇.Cl

*Example 5*

To 38.7 parts of 2-chloroethyl chloromethyl ether, which is cooled to 0° C. and stirred, there are slowly added 52.5 parts of N-benzyl piperidine. 50 parts of pyridine are then added and the mixture is heated to 100° C. and stirred at that temperature for 2 hours. There is thus obtained a stiff red gum which is essentially a compound believed to have the formula

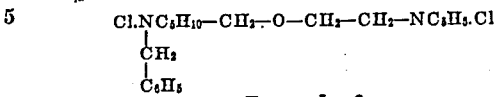
Cl.NC₅H₁₀—CH₂—O—CH₂—CH₂—NC₅H₅.Cl
            |
            CH₂
            |
            C₆H₅

*Example 6*

52 parts of 2-bromoethyl chloromethyl ether (prepared by interaction of 2-bromoethanol with formaldehyde and hydrogen chloride) are stirred at 0° C. and 100 parts of pyridine are slowly added. The mixture is then heated slowly to 100° C. and maintained at that temperature for 2 hours. There is thus obtained a stiff pale brown resinous mass which rapidly crystallises. When this is recrystallised from absolute ethyl alcohol there are obtained small white crystals of M. P. 165° C. The compound so obtained has the formula

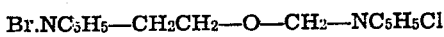
Br.NC₅H₅—CH₂CH₂—O—CH₂—NC₅H₅Cl

*Example 7*

Bleached cotton limbric dyed to a 2% shade with Chlorazol Fast Red K (Colour Index No. 278) is impregnated with an aqueous solution containing 20 parts of pyridoethyl pyridomethyl ether dichloride of the formula

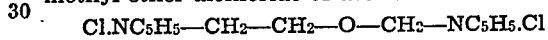
Cl.NC₅H₅—CH₂—CH₂—O—CH₂—NC₅H₅.Cl and 3 parts of ammonium dihydrogen phosphate per 1000 parts of water. The fabric is then squeezed until it is double its initial weight, dried at 40° C. and heated for 10 minutes at 150° C. The fastness of the dyeing to water and to aqueous soap washing is thus very much improved.

*Example 8*

Spun viscose material is padded in an aqueous 5% solution of pyridoethyl pyridomethyl ether dichloride, squeezed until it is double its initial weight, dried at 50° C. and then heated for 20 minutes at 140° C. The material may now be dyed with acid dyestuffs in the manner normally used for dyeing wool.

For instance, 100 parts of the treated viscose are dyed for 1 hour at the boil in a solution containing 2 parts of Fast Acid Violet A2R (Colour Index No. 758), 1 part of glacial acetic acid and 10 parts of sodium sulphate in 3000 parts of water. The viscose is thus dyed a full violet shade which is fast to aqueous soap washing.

As many apparently widely different embodiments of this invention may be made without departing from the spirit and scope thereof, it is to be understood that the invention is not limited to the specific embodiments thereof except as defined in the appended claims.

We claim:

1. New ethers which are also di-quaternary-ammonium compounds of the formula

Y—Z—A—CH₂—O—CH₂—Z'—X wherein Z and Z' each represent a tertiary amine and may be alike or different, X and Y each represents a halogen atom selected from the group consisting of chlorine and bromine atoms, and A stands for a divalent aliphatic hydrocarbon radical.

2. Process for the manufacture of ethers which are also di-quaternary-ammonium compounds of the formula

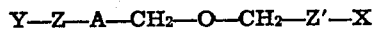
Y—Z—A—CH₂—O—CH₂—Z'—X wherein Z and Z' each represent a tertiary amine and may be alike or different, X and Y each represent a halogen atom selected from the group consisting of chlorine and bromine atoms and A stands for a divalent aliphatic hydrocarbon radical, which comprises causing a dihalogenoalkyl ether of the formula

Y—A—CH₂—O—CH₂—X wherein X, Y and A have the meanings given above, to react with one molecular proportion of a tertiary amine at a temperature of about 0° C. to room temperature, and by the application of heat causing the resultant product to react with one molecular proportion of a tertiary amine so as to form a di-quaternary-ammonium compound.

3. A new compound, pyridylethyl pyridylmethyl ether dichloride of the formula

Cl·NC₅H₅—CH₂—CH₂—O—CH₂—NC₅H₅·Cl

4. A new compound, 3-pyridylpropyl pyridylmethyl ether dichloride of the formula Cl·NC₅H₅—CH₂—CH₂—CH₂—O—CH₂—NC₅H₅·Cl 5. A compound of the formula Cl·(C₂H₅)₃N—CH₂—O—CH₂—CH₂—NC₅H₅·Cl

REGINALD JOHN WILLIAM REYNOLDS.
JOHN DONALD ROSE.
ERIC EVERARD WALKER.